United States Patent [19]
Gilbertson et al.

[11] Patent Number: 5,404,518
[45] Date of Patent: Apr. 4, 1995

[54] SYSTEM FOR BUILDING A USER-DETERMINED DATABASE OF SOLUTION DOCUMENTS FROM QUERIES THAT FAIL WITHIN IT AND FROM THE SEARCH STEPS THAT DO PROVIDE A SOLUTION

[75] Inventors: Eric J. Gilbertson, Menlo Park; Sarah L. Nunke, Sunnyvale, both of Calif.

[73] Assignee: Answer Computer, Inc., Sunnyvale, Calif.

[21] Appl. No.: 268,712

[22] Filed: Jun. 30, 1994

Related U.S. Application Data

[63] Continuation of Ser. No. 810,953, Dec. 19, 1991, abandoned.

[51] Int. Cl.⁶ .................. G06F 15/403; G06F 15/40
[52] U.S. Cl. ........................ 395/600; 364/DIG. 1; 364/408; 364/419.19; 364/225.3; 364/282.1; 364/282.3
[58] Field of Search ........... 395/600; 364/408, 419.19

[56] References Cited

U.S. PATENT DOCUMENTS

| | | | |
|---|---|---|---|
| 3,662,400 | 5/1972 | Geil | 395/700 |
| 4,972,328 | 11/1990 | Wu et al. | 395/75 |
| 4,975,840 | 12/1990 | Detore et al. | 364/401 |
| 5,006,992 | 4/1991 | Skeirik | 395/68 |
| 5,019,992 | 5/1991 | Brown et al. | 364/468 |
| 5,162,992 | 11/1992 | Williams | 364/419 |
| 5,208,748 | 5/1993 | Flores et al. | 364/419 |
| 5,241,671 | 8/1993 | Reed et al. | 395/600 |
| 5,261,102 | 11/1993 | Hoffman | 395/700 |
| 5,263,157 | 11/1993 | Janis | 395/600 |
| 5,315,504 | 5/1994 | Lemble | 364/400 |
| 5,335,323 | 8/1994 | Kolnick | 395/164 |

Primary Examiner—Paul V. Kulik
Assistant Examiner—Wayne Amsbury
Attorney, Agent, or Firm—Fenwick & West

[57] ABSTRACT

A computer system and method are disclosed for integrating call management to the retrieval of documents in response to user inquiries. The system consists of a processor connected to an incident table register, a user table register and a document tree data base. The incident table register records and stores information related to the user inquiry, the user table stores information related to the user's identity and the document tree data base stores a plurality of documents, useful in addressing user inquiries. Various linkages connect information stored in the various tables and registers, thereby making the system integrated with respect to the user's identity, the user's inquiry and the identity of the document which ultimately resolves the inquiry.

11 Claims, 12 Drawing Sheets

SYSTEM FOR BUILDING A USER-DETERMINED DATABASE OF SOLUTION DOCUMENTS FROM QUERIES THAT FAIL WITHIN IT AND FROM THE SEARCH STEPS THAT DO PROVIDE A SOLUTION

This is a continuation of application Ser. No. 07/810,953, filed on 19 Dec. 1991, now abandoned.

BACKGROUND OF THE INVENTION

1. Field of the Invention

This invention relates to a heuristic learning application program, and more particularly to a system and method for entering user specific problems and for heuristically retrieving documented solutions within the system while maintaining connectivity between the user and the problem.

2. Description of the Background Art

Traditional expert systems are well established in the art. Expert systems are generally viewed as computing machines which are programmed with a large number of questions and answers. The user of an expert system poses his problem in the form of one or more of the programmed questions and receives an answer corresponding to the questions asked. Drawbacks of this traditional expert system relate to the requirements that the questions must be accurately posed and that the questions and answer must have been previously programmed.

A real difficulty in the traditional expert system results from the fact that users are prone to asking the "wrong questions," which invariably lead to wrong solutions. Users ask "wrong questions" when they are unable to clearly articulate the symptoms, when they do not understand the problem, or simply because they make a mistake in conveying the information. When a wrong question is asked, either no solution will be found, or the solution which is found will not solve the problem intended. When an unprogrammed question is asked, either correctly or by mistake, no solution will be found. In this instance a knowledgeable computer programmer must intervene to program the question and the correct answers, which will lead to a desired solution to the given problem.

Another important drawback of expert systems and solution retrieval systems generally, is that the user who originally poses the problem is not actively connected to the problem. This a problem because the system is prohibited from providing the user with new information as it develops on the posed question. This connectivity between user and problem should originate when the user first addresses the computer system and poses the problem. There are no known expert systems in which the user's prior problems or "incidents" are recorded in a manner useful for contributing to the present solution with respect to that particular user. Furthermore, unless the user and incident are connected, there is no way to know whether a given user's problem has been solved.

SUMMARY OF THE INVENTION

In accordance with the present invention, an inquiry management system and method for integrating user inquiries and solution retrieval enables a user to interrogate a data base of hierarchically ordered solution documents in order to solve a user specific problem. The inquiry management system consists of a processor and a tree structured data base linked by a plurality of registers and memories. The user logs an inquiry into the system and proceeds to search for a solution document by following appropriate paths of the tree data base. Registers are available for linking the user, the problem inquiry and the resulting solution document, so that the user can be notified of future solution document updates and so that the system can track the usage and solution history of each user. Maintenance is performed by a system administrator who is able to easily add, modify and reposition solution documents within the data base tree structure.

DESCRIPTION OF THE PREFERRED EMBODIMENT

The preferred embodiment of the present invention is implemented on a general purpose, microprocessor based, Sun Microsystems computer. The present inquiry management system 10 is maintained and operated by a system administrator who is generally knowledgeable about the subject matter being supported, as well as the computer hardware and software comprising the preferred embodiment. In addition to the system manager, there may be a data owner who is knowledgeable about the data and various solution documents, but who is not charged with operation or maintenance of the management system and its hardware components.

Figure 1A:
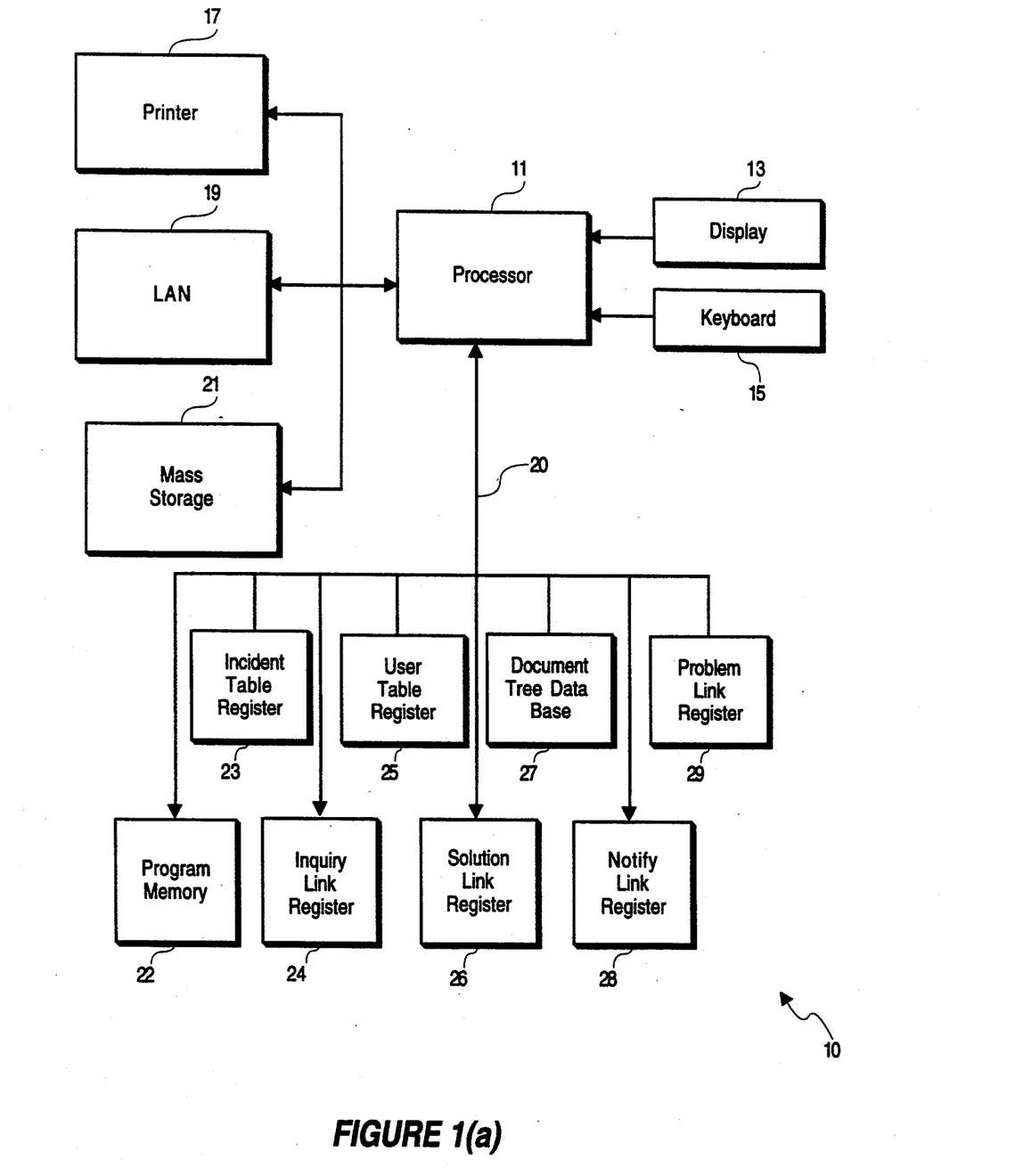
FIG. 1(a) is a schematic block diagram of the inquiry management system (10) of the present invention.

Referring now to FIG. 1, inquiry management system 10 of the present invention is shown having a processor 11 which is connected to keyboard 15 and display 13. Keyboard 15 and display 13 enable a user to interact with processor 11 by entering data and viewing the displayed contents of various memories. Also connected to processor 11 are printer 17, mass storage 21, and local area network 19. Printer 17 enables the user to make a permanent record of the various memory contents. Mass storage 21 is useful for long term storage and for maintaining large quantities of data. Local area network 19 enables the user to exchange data files and to interact with the memories and processors of other computer systems.

Figure 1B:
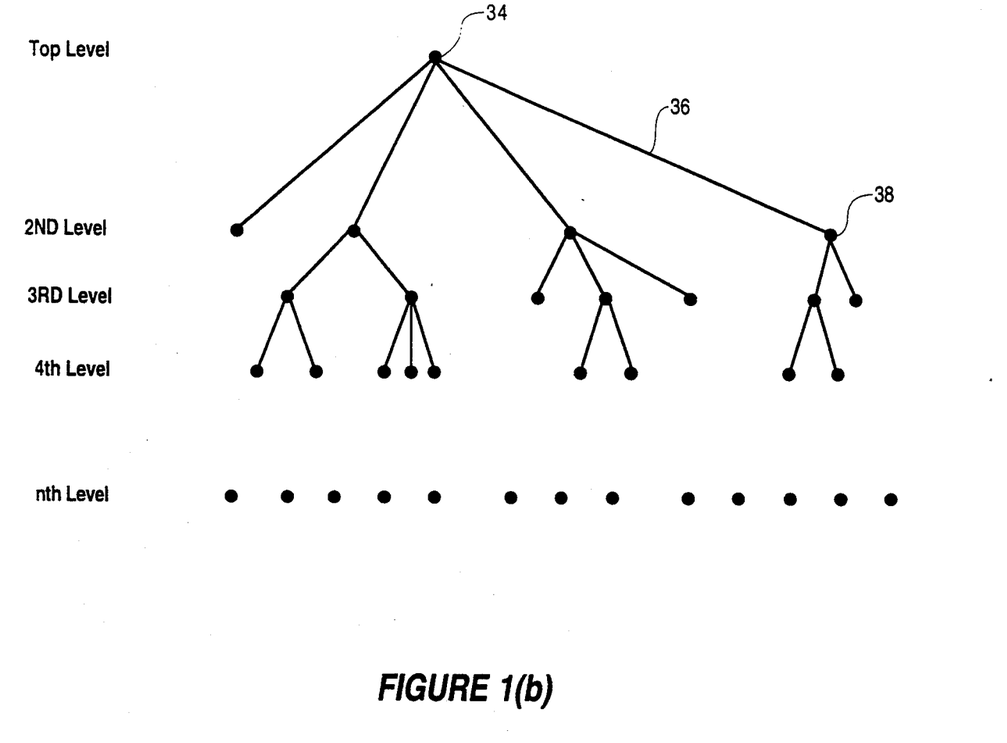
FIG. 1(b) is a node diagram showing a typical document tree data base (27) structure of the present invention.

Connected to inquiry management system 10 by data bus 20 are a plurality of special purpose memories and registers which are utilized by processor 11 in executing programming steps which are resident in program memory 22. Document tree data base 27 contains a collection of solution documents designed to provide assistance to users who log inquiries into the system. As in a traditional expert system, the user logs onto system 10 and presents a problem or incident to be solved by a solution document resident in the system. Rather than stating the problem as a series of questions, as in the classical expert environment, the user searches a sequence of indexes at various nodes in the document tree data base 27. This document tree data base 27 structure can be more clearly understood by referring to FIG. 1(b). The tree structure of document tree data base 27 has a first or top level 34 which contains a list of solution documents which might be useful in solving typical user problems. In addition to the list of solution documents, there is a menu of subindexes from which the user can chose to search an additional, more narrowly focussed list of solution documents. If a subindex from the menu is chosen, the user will move along tree path 36 to a second level node 38 containing a new list of solution documents and a new list of subindexes. The search can be continued in this manner descending through n-levels until the desired document is found.

Referring now to FIG. 1(a), incident table register 23, user table register 25, inquiry link register 24, solution link register 26, document tree data base 27, notify link register 28, document table register 18, problem table register 12, report back link register 14, new solution link register 16, and problem link register 29 are also connected to data bus 20. Incident table register 23 consists of an array of memory elements containing records of all user inquiries. Each time a user accesses inquiry management system 10, the system logs and stores in incident table register 23 the incident and the search steps performed by the user in search of the solution documented. User table register 25 consists of a list of all authorized users of inquiry management system 10. This user table register 25 contains such information as the user's name, company affiliation, address, phone, number and other personal information related to the user's history or circumstances. Document table register 18 contains a list of document addresses which point to various documents held in document tree data base 27.

Inquiry link register 24 stores the mapping or link between the incident table register 23 and the user table register 25. When the user logs onto system 10, inquiry link register 24 records the location in the user table register 25 pointing to the user's identification and attaches to that pointer an address relating to the location in incident table register 23 corresponding to the incident. This inquiry link provides important correspondence between the user and the user inquiry. Using this correspondence link, the system administrator is able to track the on-going problems of each user.

Solution link register 26 is similar in structure to inquiry link register 24 except that the contents of the incident table register 23 relating to the present inquiry is mapped to a solution document in document tree data base 27. This linkage or mapping between an inquiry and a solution document allows the system 10 administrator to monitor the effectiveness of document tree data base 27 and to perform updates and maintenance on specific solution documents based on usage.

Notify link register 28 records the mapping between user table register 25 and the solution document in document tree data base 27 using document table register 18. This linkage allows the system administrator to maintain a list of all users who have an interest in a specific document, enabling the administrator to notify the users when a change or update to the document is created. Problem link register 29 connects the contents of incidence table register 23 to problem table register 12, enabling the user to notify the system administrator of an inquiry for which no appropriate solution document was found One example of the use of this linkage would be if a useful solution document was continually not being retrieved for a recurring problem or incident. Recognizing this pattern from the data stored in problem link register 29, the administrator could take action to either improve the solution or restructure the document tree paths 36 so that a more useful solution document to the given inquiry is found.

EXAMPLE 1

Figure 2A:
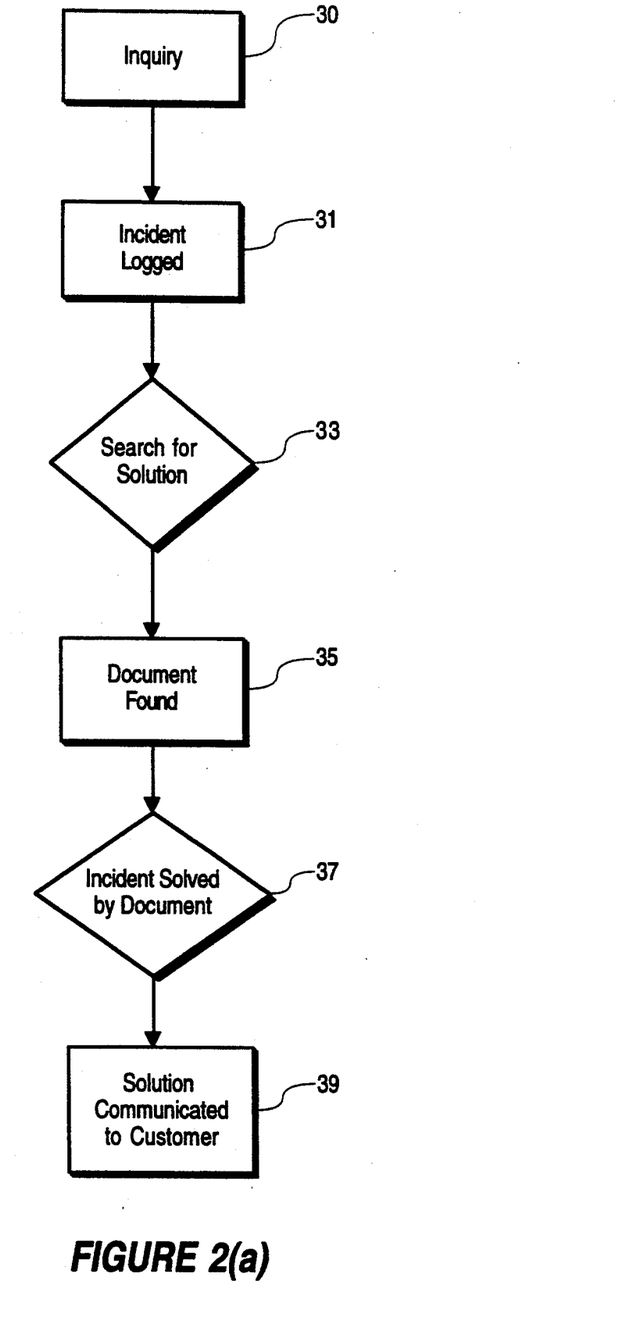
FIG. 2(a) is a flow diagram showing the initial inquiry to the system (10) of the present invention by a user and the steps of a preferred method leading to the solution document of the logged incident.
Figure 2B:
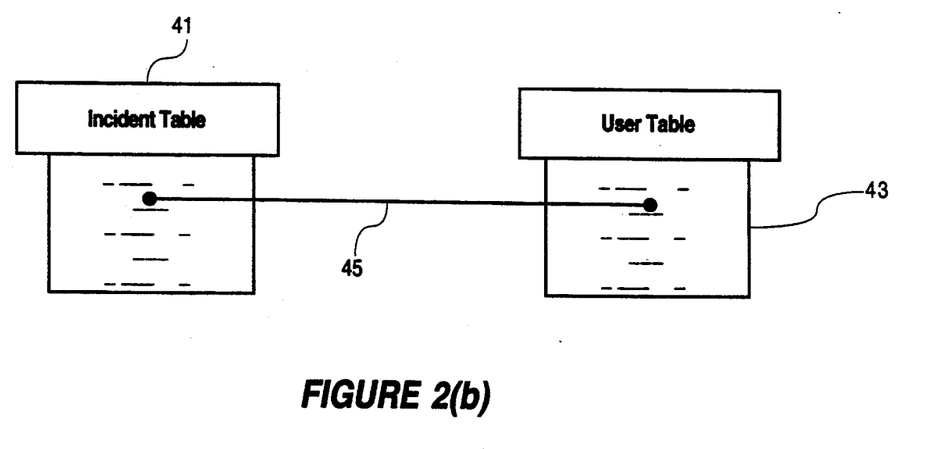
FIG. 2(b) is a block diagram showing the relationship and link between the incident table (41) and user table (43) established in the method of FIG. 2(a)

Referring now to FIG. 2(a), a block diagram shows the steps of a first example employing the inquiry management system 10 of the present invention. This first example begins with the user making an inquiry of system 10 in step 30. For the purposes of this example, we will assume that the user is the purchaser of a new toaster who has a problem with burnt toast and that the system is being administered by the toaster manufacturer. The user makes inquiry into the system either directly or through the system administrator. In step 31, the incident (burnt toast complaint) is logged into inquiry management system 10 though keyboard 15. Information relating to the burnt toast complaint is stored in incident table register 23 by processor 11. At the time of the initial inquiry, processor 11 creates inquiry record link 45 in FIG. 2(b), and stores this link into inquiry link register 24. This linkage connects incident table 41 to user table 43 and maps the inquiry to the user for future reference. With reference to FIG. 1, when incident table 41 is generated the link is established to user table 43 and incident table is stored in incident table register 23.

Figure 2C:
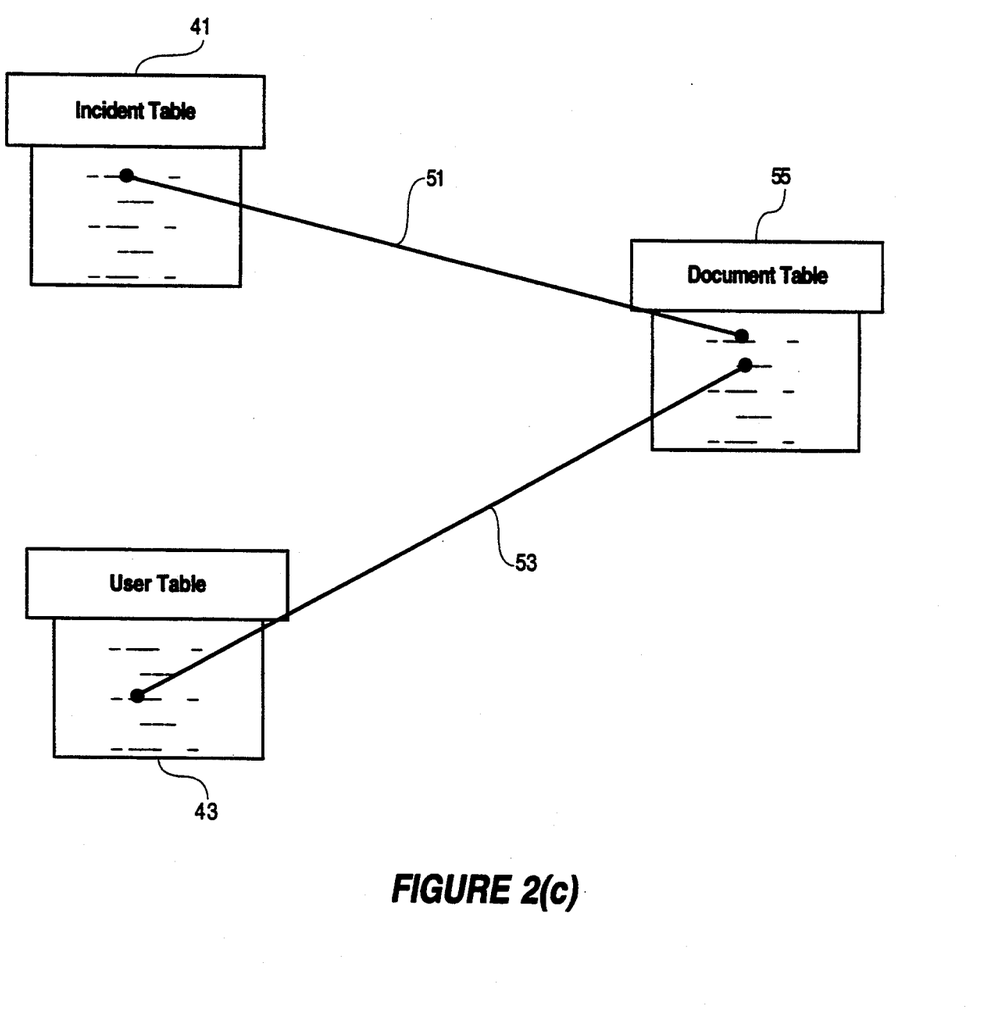
FIG. 2(c) is a block diagram showing the relationship and links between the incident table (41), document table (55) and user table (43) of the method of FIG. 2(a)

In step 33, the user begins the search of document tree data base 27 for a solution document relating to the subject of burnt toast. The top level node 34 is first searched for subjects related to the problem, e.g., making toast. The user will then follow tree path 36 to a second level node 38 where a related solution document might be found (step 35) and read related to the incident. Such a solution document might be titled "What to Do When the Toaster Burns the Toast," which suggests moving the toasting time indicator to a lighter setting. If this solution document solves the incident (step 37), the user can optionally print the solution on printer 17. If the system administrator is operating system 10 on behalf of the user, the administrator will then notify the user of the solution document in step 39. Concurrent with step 37, a solution link 51 is created between incident table 41 and document table 55 (FIG. 2(c)). Solution link 51 is stored in solution link register 26. Notify link 53 is also created between document table 55 and user table 43 and stored in notify link register 28. Notify link 53 enables the system administrator to contact the user in the event that changes are made to the burnt toast document in the future. Solution link 51 enables the administrator to track the users who inquire about burnt toast and are assisted or not by the document retrieved.

EXAMPLE 2

Figure 3A:
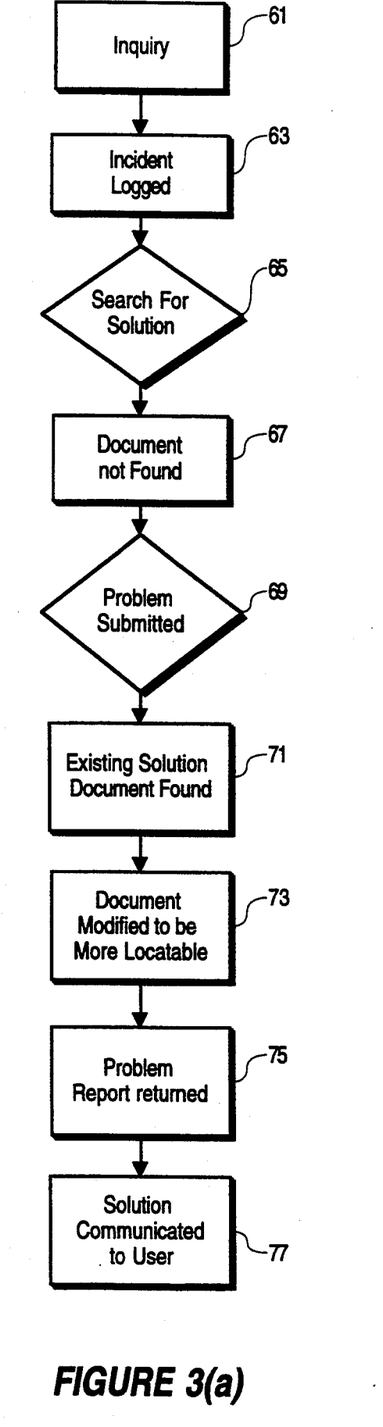
FIG. 3(a) is a flow diagram showing the initial inquiry to the system (10) of the present invention and the steps leading to the solution document when the solution document is not initially located during a search of the document tree data base (27)
Figure 3B:
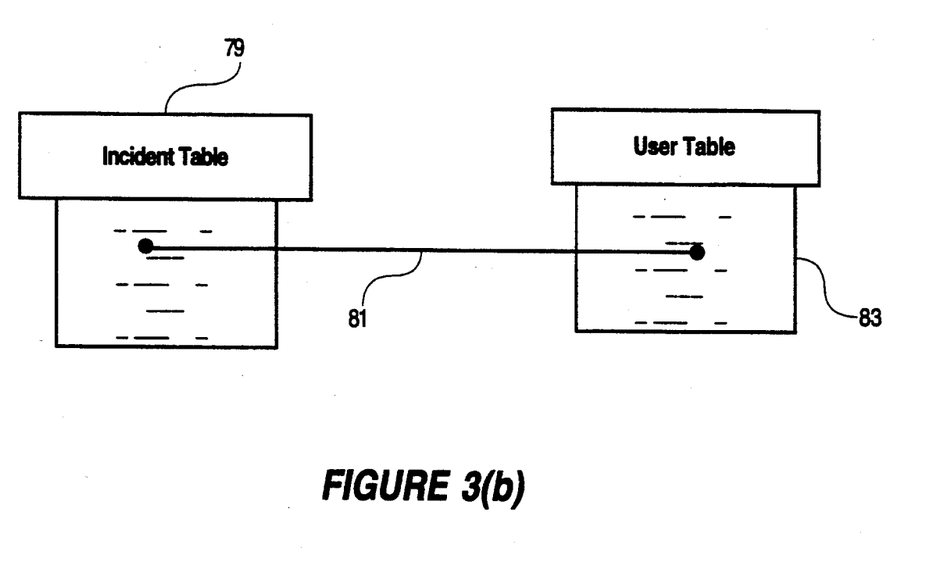
FIG. 3(b) is a block diagram showing the relationship and link between the incident table (79) and user table (83) established in the method of FIG. 3(a)
Figure 3C:
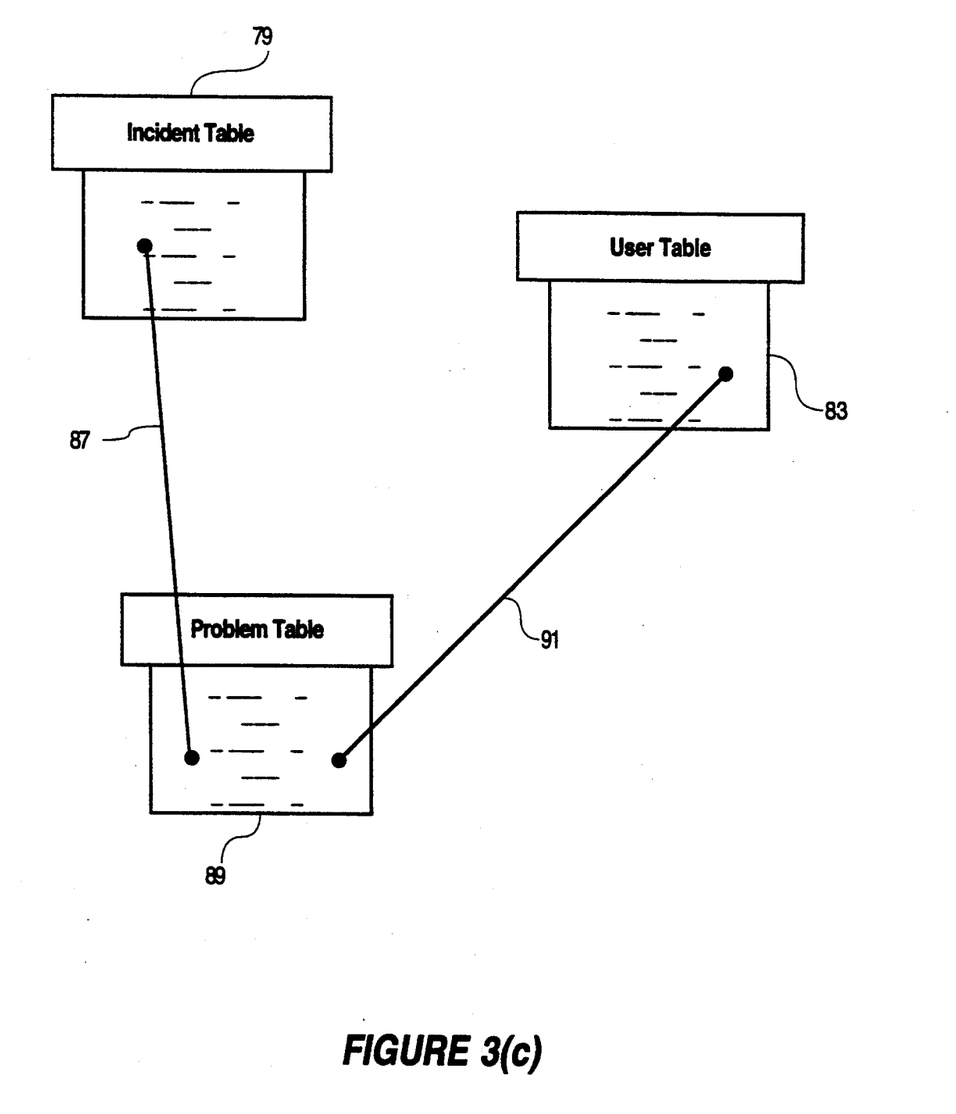
FIG. 3(c) is a block diagram showing the relationship and links between the incident table (79), problem table (89) and user table (83) established in the method of FIG. 3(a)

Referring now to FIG. 3(a) and FIG. 3(b), the user first makes an inquiry of the system in step 61. The inquiry is logged to incident table 79 which is linked to user table 83 through inquiry link 81. A search is made of document tree data base 27 in step 65, in the same manner as the search performed in Example 1. For the purposes of this second example, it will be assumed in step 67 that no solution document is found. A problem report is then submitted 69 to the administrator to review. In step 71 of this example, the administrator will locate a solution document within document tree data base 27, and will then modify the structure of the document tree data base 27 to make the solution document more useful to other users who inquire later with the same problem. In step 75, an entry is made to problem table 89 of FIG. 3(c) and a corresponding problem link 87 connects problem table 89 to incident table 79. Report back link 91 is also created between problem table 89 and user table 83. Problem table 89 preserves a record of the inquiry and subsequent search in the problem report to aid in the maintenance and administration of system 10 which is stored in problem table register 12. Report back link 91 enables the administrator to contact the user in step 77, once the specific solution document has been located or created. Report back link 91 is stored in report back link register 14.

EXAMPLE 3

Figure 4A:
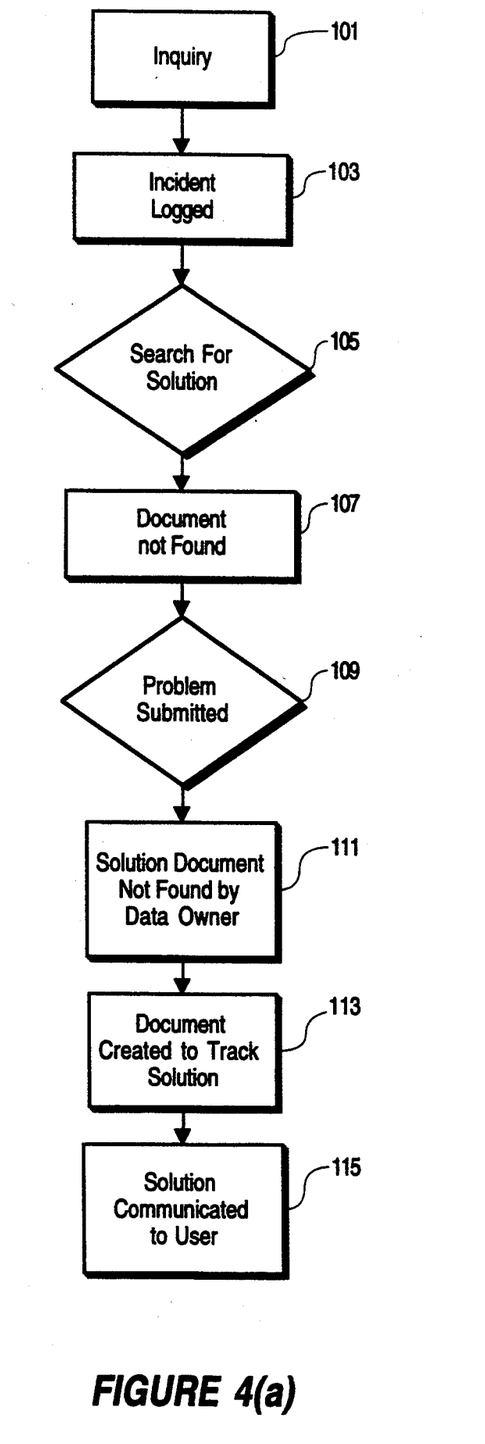
FIG. 4(a) is a flow diagram showing the initial inquiry to the system (10) of the present invention by a user and the steps of a preferred method leading to the solution document of the logged incident in the situation when the system (10) administrator creates a solution document to solve the initial inquiry.
Figure 4B:
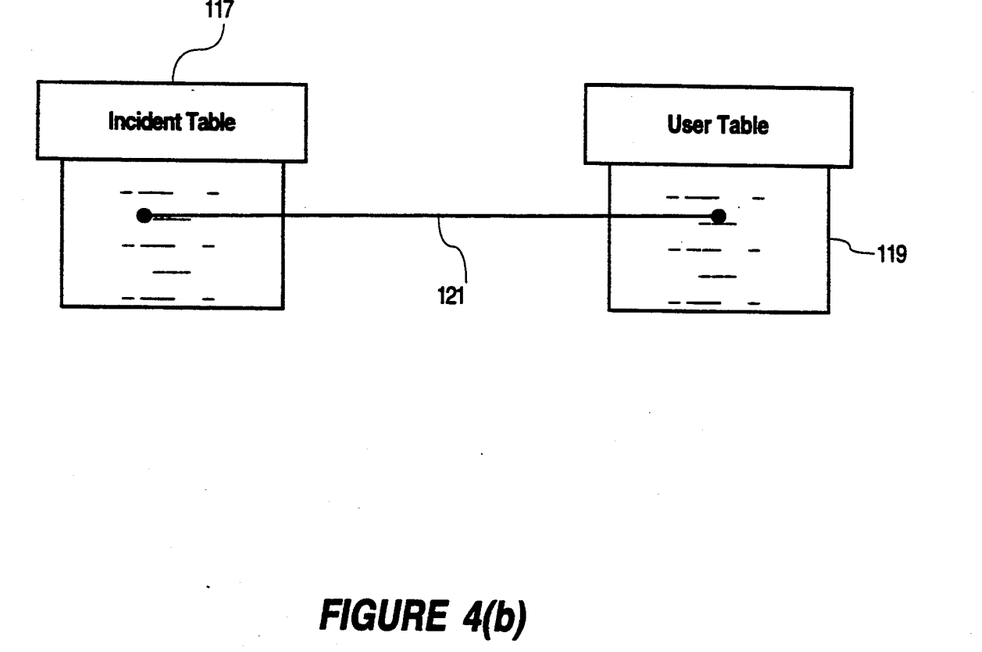
FIG. 4(b) is a block diagram showing the relationship and link between the incident table (117) and user table (119) established in the method of FIG. 4(a)

Referring now to FIG. 4(a), the user makes an inquiry into management system 10 in step 101, and the inquiry is logged to inquiry table 117 of FIG. 4(b), in step 103. At the time the incident is logged, inquiry link 121 is established connecting the incident description contained in incident table 117 to the specific user identified in user table 119. In step 105, the search for a solution document useful in answering the inquiry is undertaken in the same manner as described in Example 1.

Figure 4C:
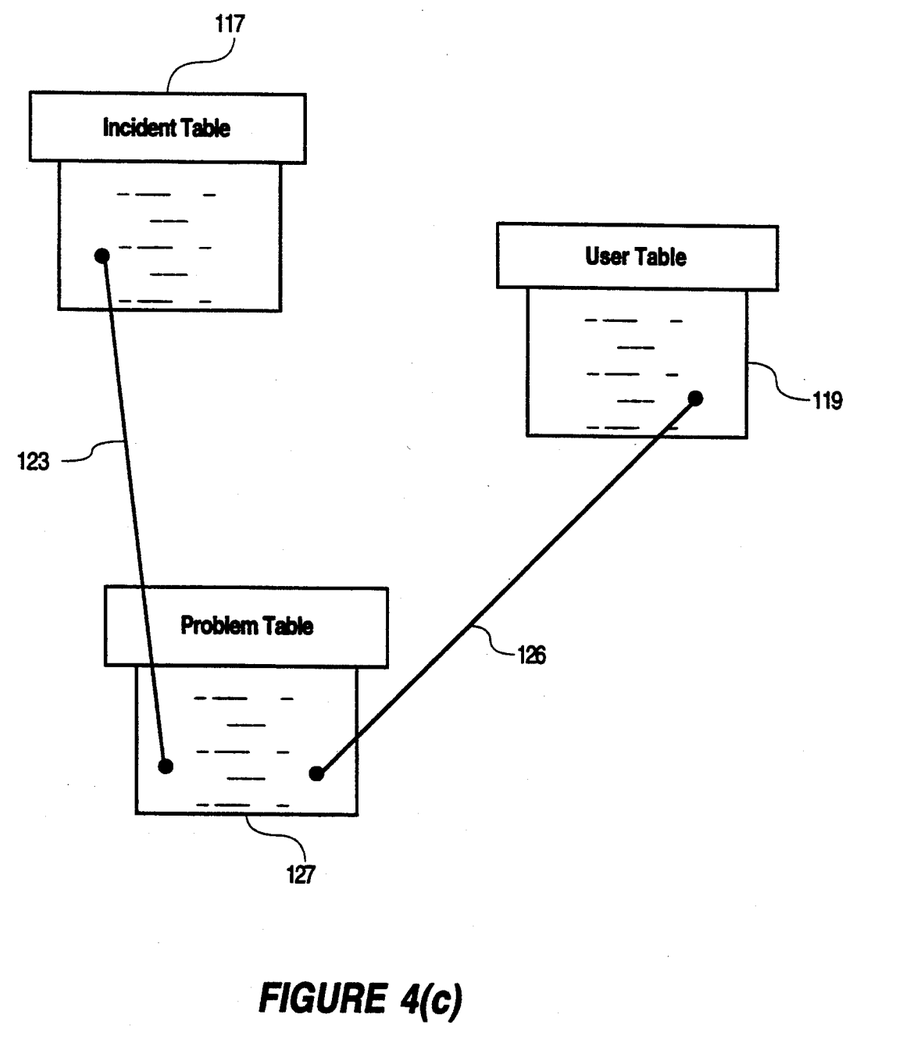
FIG. 4(c) is a block diagram showing the relationship and links between the incident table (117), problem table (127) and user table (119) established in the method of FIG. 4(a)

Assume for the purposes of this third example that no solution document is found in step 105. A problem report is generated by management system 10 in step 109, alerting the system administrator that an inquiry has been posed for which no adequate solution has been found. Using the problem report, the system administrator will manually solve the incident in step 111, for which no solution document has been previously found. The problem report is stored in problem table 127 and linked to incident table 117 through problem link 123, and to user table 119 through report back link 126. Problem link 123 enables the administrator to access the original inquiry report stored in incident table 117, and assists in generating the solution to the unsolved inquiry. Report back link 126 connects problem table 127 to the user identified in user table 119, so that the administrator can report back to the user once the solution is determined.

Figure 4D:
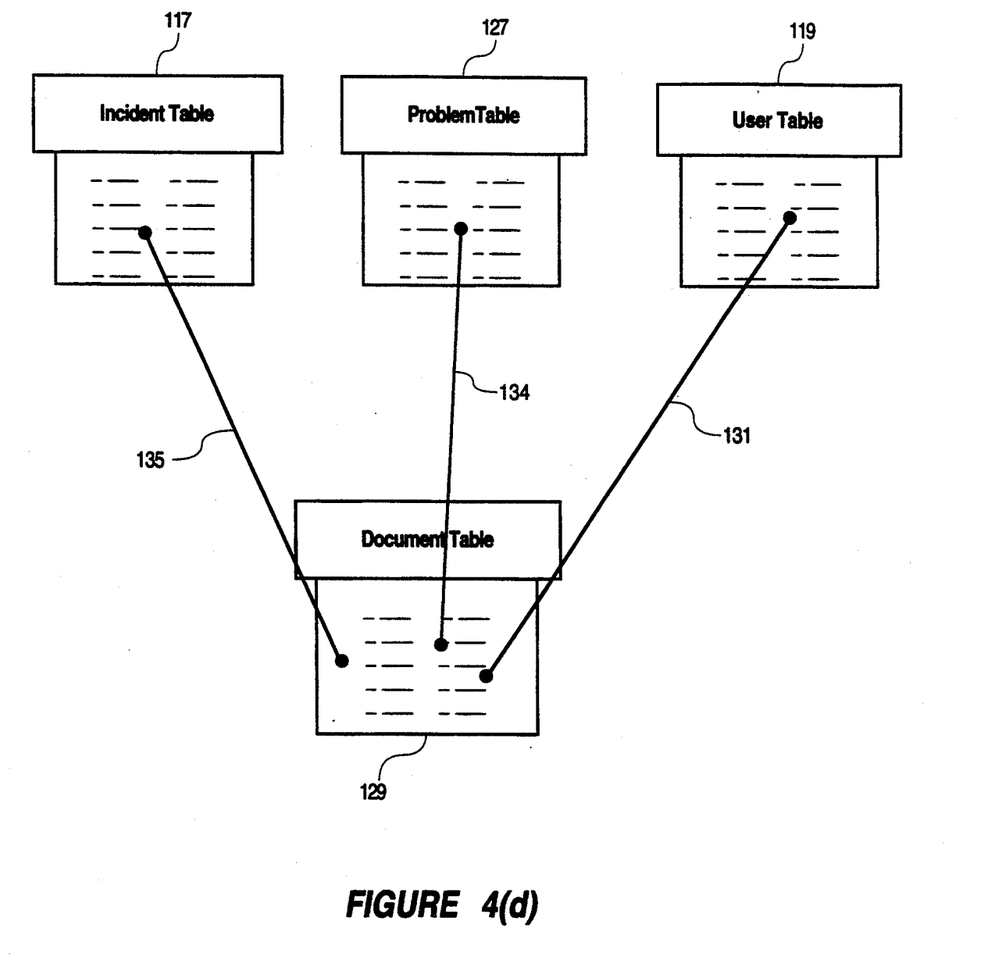
FIG. 4(d) is a block diagram showing the relationship and links between the incident table (117), document table (129), problem table (127) and user table (119) established in the method of FIG. 4(a).

Once the system administrator has solved the problem from the underlying inquiry, a new solution document is created in step 113 to record the solution. This solution document is then inserted into one or more locations in document tree data base 27 using new solution link 134, which is stored in new solution link register 16, and made available to future users. FIG. 4(d) shows the incident link 135 connecting incident table to document table 129. The solution document to the original inquiry is then communicated to the user in step 115, utilizing the notify link 131 and user table 119.

The invention has now been explained with reference to specific embodiments. Other embodiments will be apparent to those of ordinary skill in the art in light of this disclosure. Therefore it is not intended that this invention be limited, except as indicated by the appended claims.

We claim:

1. A method for managing user inquiries and a database of solution documents providing solutions to the user inquiries, the method comprising the steps of:

receiving and storing a user inquiry for which a retrieved solution document may provide a solution;

identifying and storing an identity of a user presenting the user inquiry;

linking the identity of the user to the user inquiry;

retrieving a solution document providing a solution to the user inquiry from the database using at least one search step and notifying the user of the retrieved solution document; and if no solution document providing a solution to the user inquiry is retrieved, creating a problem report identifying the user inquiry and the search steps, creating a new solution document responsive to the problem report, storing the new solution document in the database such that repeating the search steps retrieves the solution document, and notifying the user of the solution document.

2. The method of claim 1, further comprising the steps of:

linking the retrieved solution document to the user inquiry; and linking the retrieved solution document to the identity of the user.

3. The method of claim 1, further comprising the steps of:

linking the new solution document to the user inquiry for which no solution document was retrieved; and linking the new solution document to the identity of the user presenting the user inquiry.

4. A document and inquiry management system comprising:

a processor for executing search instructions input by a user;

a data base structure, accessible by the processor for storing documents, for being searched by the processor in response to the search instructions for retrieving a document solving a user supplied inquiry description;

an inquiry reporter accessible by the processor for receiving and storing the inquiry description and the search instructions for searching the data base structure for a document providing a solution to the inquiry description, and providing the search instructions to the processor;

a user identifier accessible by the processor for receiving and storing identities of authorized users of the system and for identifying the identity of the user for whom the document is being retrieved from the data base structure according to the search instructions;

a link generator connecting the inquiry reporter to the user identifier in order that the processor may simultaneously identify both the inquiry description and the user for whom the document is being retrieved; and a solution report generator accessible by the processor for generating a solution report indicating that a document solving an inquiry description was not retrieved by the processor, and for linking a new document solving the inquiry description to the data base structure such that repeating the search instructions retrieves the new document.

5. A computer system for managing user inquiries and solution documents solving the user inquiries, the system comprising:

a processor for receiving a user inquiry input by a user and user indicia identifying the user of the system;

an incident table register coupled to the processor for storing the user inquiry;

a user table register coupled to the processor for storing the user indicia, the processor linking a user inquiry in the incident table register to the user indicia of the user who input the user inquiry;

a document tree data base coupled to the processor for storing a plurality of solution documents, each solution document providing a solution to at least one user inquiry in the incident table register;

a search means coupled to the processor, and directed by the user for searching the document tree data base to retrieve a solution document providing a solution to the user inquiry, linking the retrieved solution document to the user inquiry, and storing in the incident table register search steps used during the search of the document tree database;

a problem report register for storing a problem report including an unsolved user inquiry for which no solution document was retrieved by the user from the document tree data base, and the search steps used during a search of the document tree database, the document tree data base updated to include a solution document providing a solution to the unsolved user inquiry in response to the search steps.

6. The computer system of claim 5 further comprising:

a document table register coupled to the processor for storing document addresses of solution documents stored in the document tree data base, the processor accessing the document table register to link the document address of a solution document providing a solution to a user inquiry in the incident table register.

7. The computer system of claim 5 further comprising:

an inquiry link register coupled to the processor for storing the linking between a user inquiry in the incident table register and the user indicia in the user table register.

8. The computer system of claim 5 further comprising:

solution link register coupled to the processor for storing a linking between a user inquiry in the incident table register and a solution document stored in the document tree data base providing a solution to the user inquiry.

9. The computer system of claim 5 further comprising:

a notify link register coupled to the processor for storing a linking between a user indicia in the user table register and a solution document in the document tree data base providing a solution to a user inquiry input by a user identified by the user indicia, for notifying a user of the solution document if the solution document is updated.

10. The computer system of claim 5 further comprising:

a problem link register coupled to the processor for storing a linking between a problem report in the problem report register including an unsolved user inquiry for which no solution document was retrieved and that user inquiry as stored in the incident table register.

11. The system of claim 5, wherein the document tree data base comprises a hierarchical data base having a plurality of levels, each level including either at least one solution document or at least one index to sublevels, wherein the user searches the levels of the document tree data base using the search means to retrieve a solution document providing a solution to a user inquiry.

* * * * *